(12) United States Patent
Hattori

(10) Patent No.: US 8,786,892 B2
(45) Date of Patent: Jul. 22, 2014

(54) CONTROL APPARATUS, STORAGE MEDIUM IN WHICH CONTROL PROGRAM IS STORED, AND PRINTER TO EXECUTE A PLURALITY OF PROCESSING IN PARALLEL

(75) Inventor: Hiroshi Hattori, Gifu-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 229 days.

(21) Appl. No.: 13/547,237

(22) Filed: Jul. 12, 2012

(65) Prior Publication Data

US 2013/0033729 A1  Feb. 7, 2013

(30) Foreign Application Priority Data

Aug. 5, 2011  (JP) ................................. 2011-171591

(51) Int. Cl.
*G06K 15/02* (2006.01)
*H04N 1/00* (2006.01)
*H04N 1/23* (2006.01)

(52) U.S. Cl.
CPC .......... *H04N 1/00448* (2013.01); *H04N 1/2392* (2013.01); *H04N 2201/0082* (2013.01); *H04N 1/00954* (2013.01); *H04N 1/233* (2013.01)
USPC ........................................ 358/1.16; 358/1.15

(58) Field of Classification Search
USPC .............................................. 358/1.16, 1.15
See application file for complete search history.

(56) References Cited

U.S. PATENT DOCUMENTS 8,681,363 B2 * 3/2014 Abel et al. .................... 358/1.15
2008/0291496 A1 * 11/2008 Hara ............................. 358/1.16
2009/0110110 A1  4/2009 Kyusojin

FOREIGN PATENT DOCUMENTS

| JP | 2001/022612 | 8/2001 |
| JP | 2005/212250 | 8/2005 |
| JP | 2008/172515 | 7/2008 |

* cited by examiner

*Primary Examiner* — Qian Yang
(74) *Attorney, Agent, or Firm* — Frommer Lawrence & Haug LLP

(57) ABSTRACT

A control apparatus, which is configured to communicate with an external apparatus, to control a display section and a printing section, and to execute a plurality of processing in parallel, includes: a storage section which is configured to store image data to be supplied to the display section and first data transmitted from the external apparatus, a first processing executing section which is configured to execute a first processing in which the image data is supplied to the display section; a second processing executing section which is configured to execute a second processing, which is to be executed in parallel with the first processing, and in which a predetermined image processing is applied to the first data to generate second data to be stored in the storage section; and an identifying section which is configured to identify the number of the second data stored in the storage section.

18 Claims, 14 Drawing Sheets

HIGH-LOAD UI PROCESSING (1)

(2)

(3)

(4)

(5)

LOW-LOAD UI PROCESSING (1)

(3)

(5)

HIGH-LOAD UI PROCESSING (1)

(2)

(3)

LOW-LOAD UI PROCESSING (1)

(2)

(3)

HIGH-LOAD UI PROCESSING (1)

(2)

(3)

LOW-LOAD UI PROCESSING (1)

(2)

(3)

US 8,786,892 B2

CONTROL APPARATUS, STORAGE MEDIUM IN WHICH CONTROL PROGRAM IS STORED, AND PRINTER TO EXECUTE A PLURALITY OF PROCESSING IN PARALLEL

CROSS REFERENCE TO RELATED APPLICATION

The present application claims priority from Japanese Patent Application No. 2011-171591 filed on Aug. 5, 2011, the disclosures of which are incorporated herein by reference in their entirety.

BACKGROUND OF THE INVENTION

1. Field of the Invention

The present invention relates to a control apparatus which executes a plurality of processing in parallel, a control program which makes a printer execute a plurality of processing in parallel, and the printer.

2. Description of the Related Art

A technology for changing contents to be executed in a second processing according to contents which has been executed in a first processing has hitherto been available. For instance, in Japanese Patent Application Laid-open No. 2005-212250, in a printer which carries out a print processing, switching between whether or not a spool processing (a processing in which data of a print job is stored temporarily in a data storage unit) is to be executed according to an amount of data of a printing job which is subjected to the print processing, is carried out. Concretely, when the amount of data of the print job is judged to be smaller than a specified value, the print job is spooled once. Whereas, when the amount of data of the print job is judged to be not smaller than the specified value, rasterize processing is carried out without spooling the print job.

However, a case, in which the first processing is a processing of supplying image data to a display section which displays the image data, and the second processing is a processing of generating second data which is resulted by carrying out a predetermined image processing on first data, has not been mentioned in Japanese Patent Application Laid-open No. 2005-212250.

SUMMARY OF THE INVENTION

The present teaching has been made for solving the above-mentioned issues, and an object of the present teaching is to provide a technology which enables to carry out appropriately the second processing when the first processing and the second processing are to be carried out in parallel.

According to a first aspect of the present invention, there is provided a control apparatus which is configured to communicate with an external apparatus, to control a display section and a printing section, and to execute a plurality of processing in parallel, the control apparatus including:

a storage section which is configured to store image data to be supplied to the display section and first data transmitted from the external apparatus, a first processing executing section which is configured to execute a first processing in which the image data is supplied to the display section;

a second processing executing section which is configured to execute a second processing, which is to be executed in parallel with the first processing, and in which a predetermined image processing is applied to the first data to generate second data to be stored in the storage section; and an identifying section which is configured to identify the number of the second data stored in the storage section, wherein in a first case, in which the number of the second data identified by the identifying section is smaller than a predetermined threshold value, the first processing executing section is configured to execute the first processing such that a proportion of time for the first processing to unit time is a first proportion, and in a second case, in which the number of the second data identified by the identifying section is the predetermined threshold value or larger, the first processing executing section is configured to execute the first processing such that the proportion of the time for the first processing to the unit time is a second proportion which is greater than the first proportion.

According to such an arrangement, by making small the proportion of time for the first processing to unit time, it is possible to increase the proportion of time for the second processing to unit time. Therefore, it is possible to carry out the execution of the second processing appropriately.

For instance, by reducing the proportion of the time for first processing to unit time, it is possible to increase the number of second data which is generated by the second processing. As a result, it is possible to prevent a processing, which is executed by using the second data and which is executed in continuity with the second processing, from being delayed.

The present teaching can be realized by various aspects such as a control apparatus, and a method which is executed by the control apparatus, a computer program which realizes the methods or functions of the control apparatus, and a recording medium in which the computer program has been recorded.

DETAILED DESCRIPTION OF THE PREFERRED EMBODIMENTS

A first embodiment of the present teaching will be described below.

Figure 1:
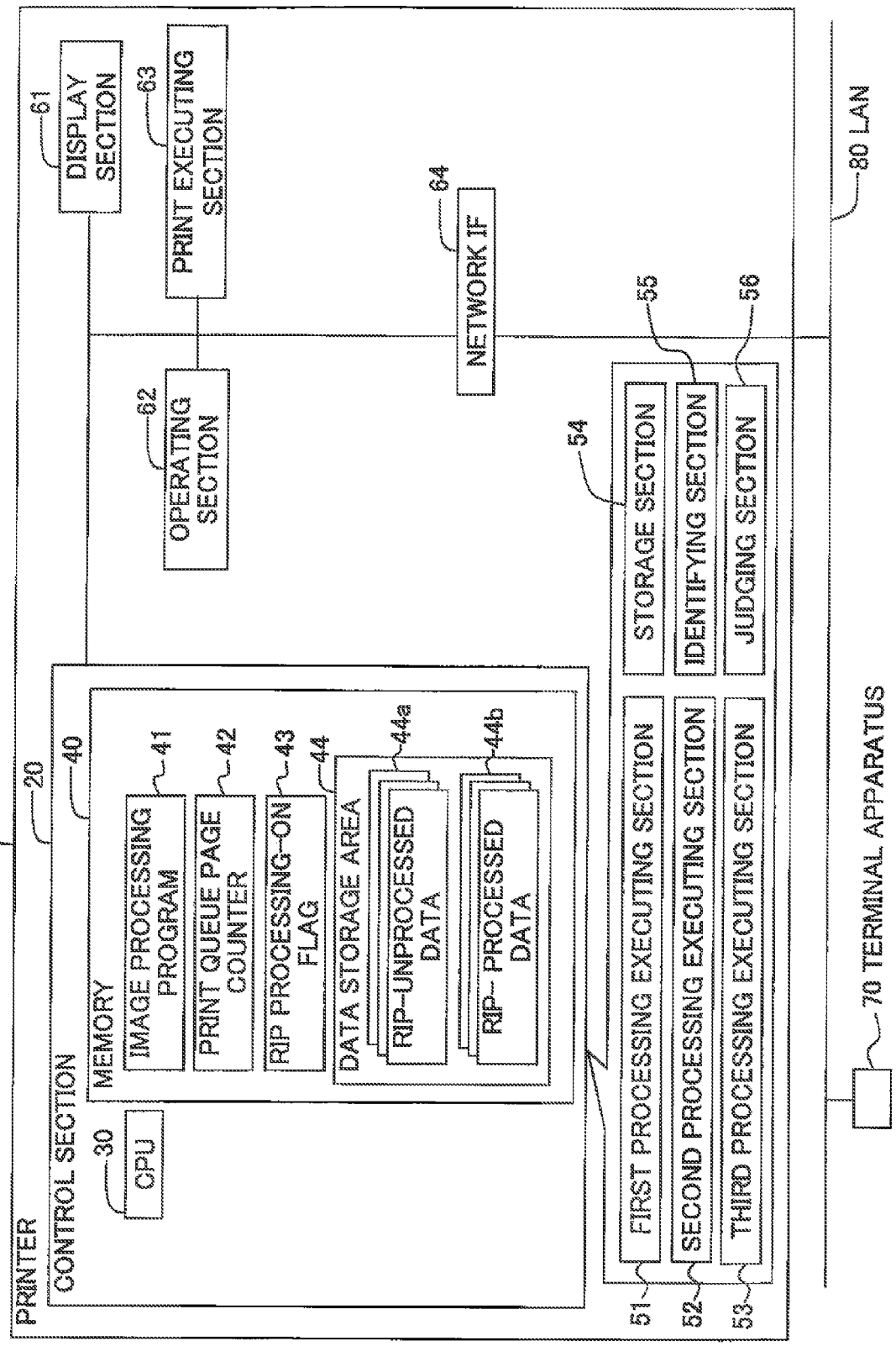
FIG. 1 is a block diagram showing a configuration of a printer according to a first embodiment.

To start with, a configuration of a printer 10 according to the first embodiment will be described below by referring to FIG. 1. The printer 10 according to the first embodiment includes a control section 20, a display section 61, an operating section 62, a print executing section 63, and a network interface 64, and each of the components is connected to a bus wire. Moreover, the printer 10 is connected to a terminal unit 70 via a LAN (local area network) which is connected to the network interface 64.

The control section 20 includes a CPU (central processing unit) 30 and a memory 40. The CPU 30 executes a processing according to an image processing program 41 which has been stored in the memory 40. By executing a processing according to the image processing program by the CPU 30, a function of each of sections 51 to 56 is realized. The memory 40 stores the image processing program 41, a print queue page counter 42 which will be described later, and an RIP processing-on flag 43 which will be described later. Moreover, the memory 40 stores RIP-unprocessed data 44a which is transmitted from the terminal unit 70 and RIP-processed data 44b which is generated by an RIP processing which will be described later, in data storage area 44 in the memory 40.

The display section 61 includes a panel, and displays various images. The operating section 62 includes a plurality of buttons. A user selects an item to be displayed on the display section 61 by operating the operating section 62. The display section 61 may also be a touch panel. In this case, the display section 61 functions also as the operating section 62. The user selects an item to be displayed by touching a partial area of screen which is displayed on the display section 61.

The print executing section 63 includes a printing mechanism of a type such as laser. The control section 20 is capable of making the print executing section 63 print and output the RIP-processed data 44b stored in the data storage area 44, by carrying out RIP processing on RIP-unprocessed data which is transmitted from the terminal unit 70 via the LAN (local area network) 80 connected to the network interface 64.

Next, an outline of image processing which is executed in the first embodiment will be described below. In the first embodiment, the control section 20 executes the following three processing in parallel. In other words, the control section 20 executes three processing namely, a UI processing of displaying image data on the display section 61, an RIP (Raster Image Processor) processing which is to be executed on print data (hereinafter, the 'RIP-unprocessed data 44a') which has been described by a page description language (PDL) transmitted from a PC (personal computer), and a print processing of printing the RIP-processed data 44b subjected to RIP processing, on a paper. The RIP processing is a processing, in which an object described by the PDL is converted to data which is expressed by a raster image in a bitmap format, based on a draw command. The RIP processing is executed for each page of the printing data and one RIP-processed data 44b corresponds to one page of the printing data.

Figure 2:
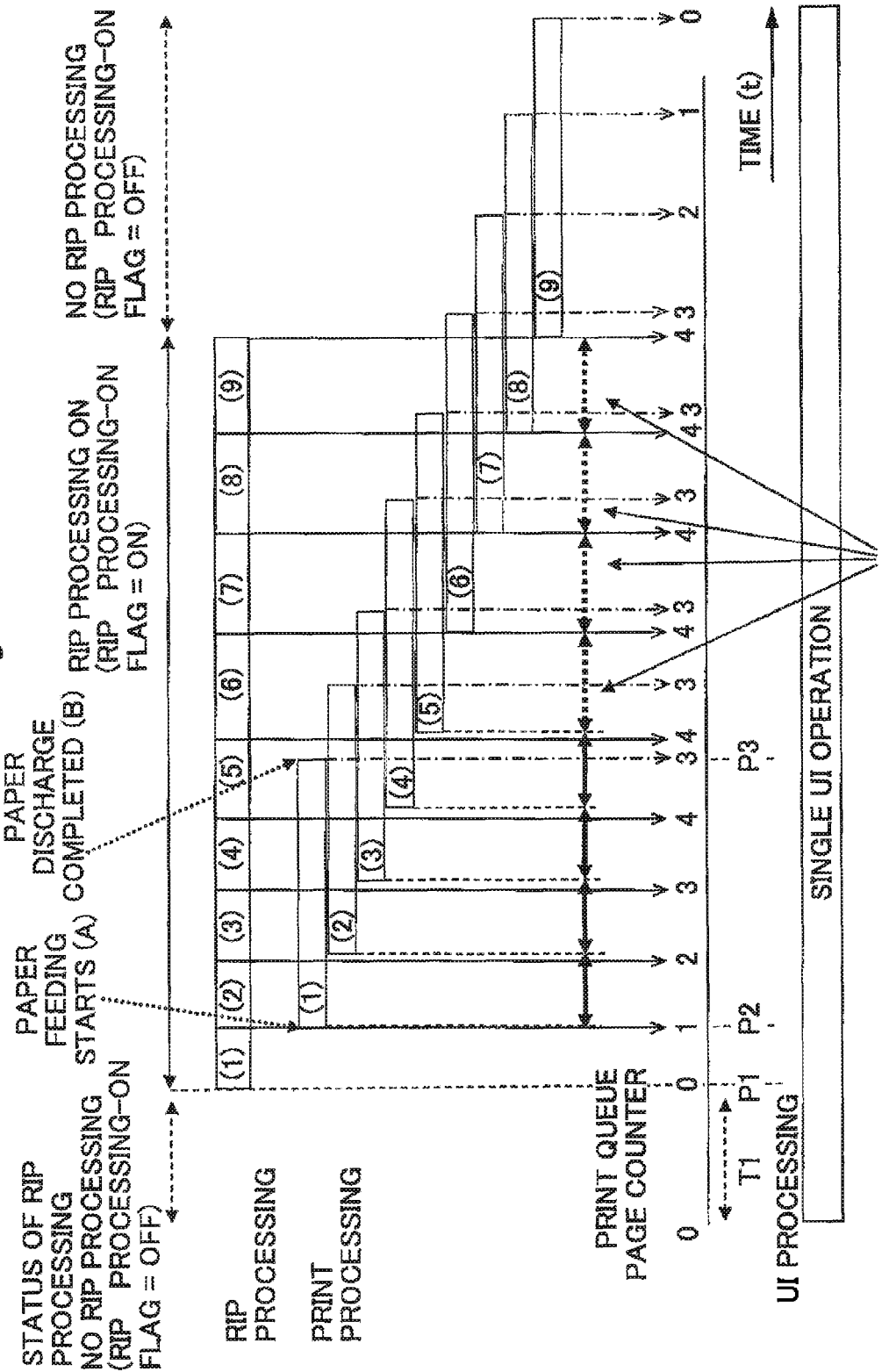
FIG. 2 is a diagram showing a time chart in which each processing is indicated along a time series.

Here, as a comparative example, an example of a case, in which the teaching according to the present application has not been executed, is shown. FIG. 2 is a diagram showing a time chart, in which an example of a case in which the above-mentioned three processing are indicated along a time series, Numbers (1) to (9) in FIG. 2 indicate a page order in which data to be processed after putting a power supply ON, is to be processed. For instance, number (5) indicates that it is data which is subjected to print processing on a fifth paper (page) after the power supply is put ON.

As shown in FIG. 2, time T1 is a time before receiving the RIP-unprocessed data from the terminal unit 70. In other words, the RIP unprocessed data has not been stored in the memory 40. Consequently, the control section 20, without executing the RIP processing and the print processing, executes only the UI processing. As the RIP-unprocessed data 44a is transmitted from the terminal unit 70, and is confirmed to have been stored in the memory 40 (time P1), the control section 20 puts the RIP processing-on flag 43 ON, and executes the RIP processing on the RIP-unprocessed data 44a. As the RIP processing on the RIP-unprocessed data 44a is completed, and the RIP-processed data 44b is stored in the memory 40 (time P2), the control section 20 increments (+1) the print queue page counter 42, and starts the print processing on the RIP-processed data 44a on which the RIP processing has been executed. The print queue page counter 42 is a counter indicating the number of the RIP-processed data 44b on which, the RIP processing has been executed, and which is waiting for the print processing to be executed thereon. Moreover, the starting of the print processing means starting paper feeding from a paper feeding tray of the printer 10, which is not shown in the diagram.

The control section 20 continues to execute the RIP processing as long as the RIP-unprocessed data 44a is stored in the memory 40. The control section 20 increments the print queue page counter 42 whenever the RIP processing for one page is completed.

As the print processing on the RIP-processed data 44b for the first page is completed (time P3), the control section decrements (−1) the print queue page counter 42. The completion of the print processing means that the RIP-processed data is printed on a paper and a document is discharged from a paper discharge tray of the printer 10, which is not shown in the diagram.

The control section 20 starts the print processing when the following two conditions are satisfied. In other words, the control section 20 starts the print processing when the two conditions namely, condition (1) the RIP-processed data 44b has been stored in the memory 40, and condition (2) a timing at which the print executing section 63 can start the paper feeding, are satisfied.

Here, the condition (2) will be described below. The control section 20, in spite of the plurality of RIP-processed data 44b being stored in the memory 40, is not capable of starting printing of second RIP-processed data which is to be printed subsequent to first RIP-processed data, till a specific time Tf has elapsed after starting the print processing of the first RIP-processed data from among the plurality of RIP-processed data. In other words, in a case that the plurality of RIP-processed data 44b has been stored, the control section 20 is capable of starting the print processing of the second RIP-processed data after the specific time Tf has elapsed after starting the print processing of the first RIP-processed data.

As shown in FIG. 2, regarding data up to data which is to be processed at the fifth page ((5) in FIG. 2), the control section 20 has been waiting for the condition (2) to be satisfied in a state of the condition (1) satisfied. Concretely, the RIP-processed data 44b is generated before the abovementioned time Tf is elapsed. Consequently, the control section 20 is capable of executing the print processing in the abovementioned specific time Tf.

However, regarding data which is to be processed from a sixth page onward ((6) and (9) in FIG. 2), the condition (2) is satisfied before the condition (1) has been satisfied. Concretely, the abovementioned specific time Tf elapses before the RIP-processed data 44b is generated. Consequently, the control section 20 has to wait for the condition (1) to be satisfied irrespective of whether or not the specific time Tf has elapsed. As a result, the time required for print processing becomes longer as compared to a case in which the print processing is executed for each specific time Tf.

Therefore, in the printer 10 according to the first embodiment, the control section 20 executes the abovementioned three processing (UI processing, RIP processing, and print processing) according to the condition described below. In other words, content of the UI processing varies according to a condition regarding whether or not the RIP processing has been executed, and a condition of the number of RIP-processed data for which the RIP processing has already been carried out (the RIP processing is complete). Concretely, in a case in which conditions namely, condition (A) when the RIP processing has already been carried out (in other words, when the RIP process-on flag 43 is ON), and condition (B) when less than five RIP-processed data 44b have been stored in the memory 40 (in other words, when the print queue page counter 42 is less than 5) are satisfied together, the control section 20 executes the UI processing such that a proportion with which the UI processing is executed per unit time in the CPU 30 becomes small. In other words, control section 20 executes the UI processing for which a load on the CPU 30 is small. Whereas, in a case in which at least any one of the condition (A) and condition (B) is not satisfied, the control section 20 executes the UI processing such that the proportion with which the UI processing is executed per unit time in the CPU 30 becomes large. In other words, the control section 20 executes the UI processing for which a load on the CPU 30 is large.

Figure 3:
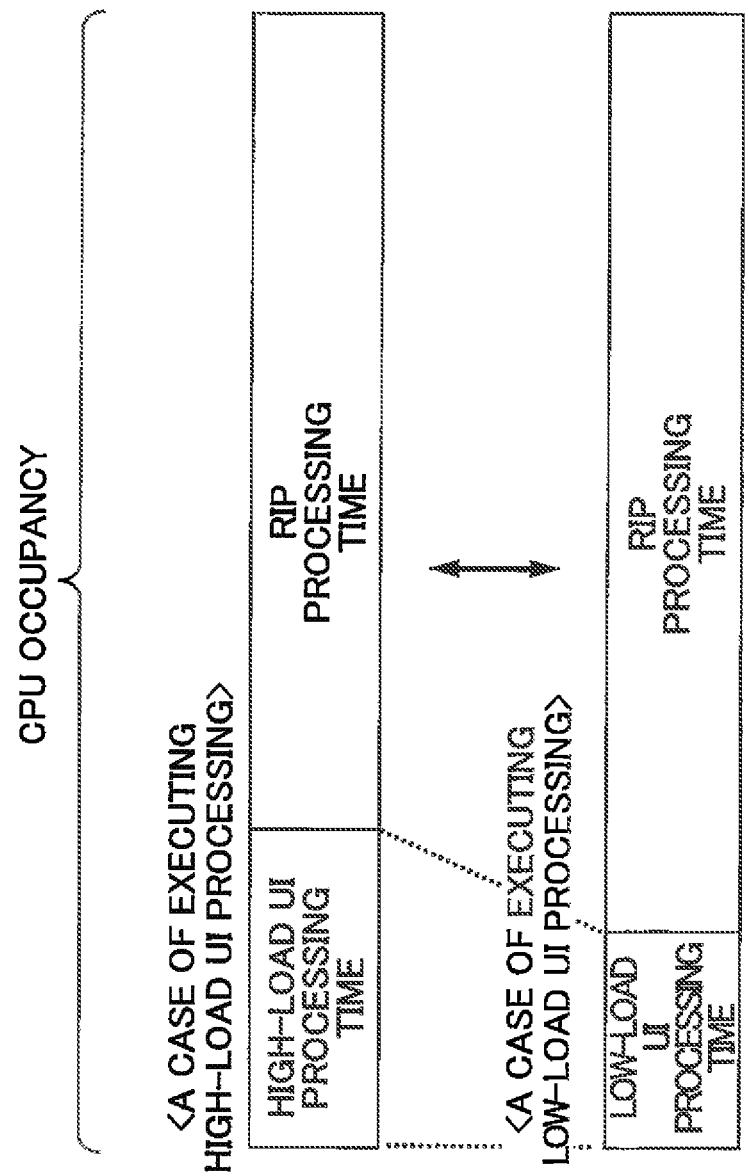
FIG. 3 is a diagram in which a proportion of a processing which a CPU executes per unit time is indicated.

FIG. 3 is a diagram which indicates a proportion of the UI processing and the RIP processing which the CPU 30 executes per unit time. As shown in FIG. 3, at the time of executing the UI processing with a low load, it is possible to execute the UI processing in a shorter time as compared to a case of executing the UI processing with a high load. Therefore, it is possible to increase relatively, the time for executing the RIP processing. As a result, the control section 20 is capable of improving a speed of generating the RIP-processed data 44b.

Regarding the condition (B) mentioned above, in the first embodiment, according to whether or not the number of the RIP-processed data 44b stored in the memory is five or more, the control section 20 switches the UI processing to be executed. However, it is possible to change the number of the RIP-processed data 44b which becomes a threshold value for the switch-over. For example, when the number of RIP-processed data is less than 10, the control section 20 is capable of executing the UI processing with a small load.

In this manner, in the first embodiment, the processing is to be carried out according to the conditions (A) and (B) mentioned above for the following reasons. Firstly, a reason for the condition (A) being imposed will be described below. When the RIP processing has not been carried out, it is considered that there is no adverse effect even when the time for which the UI processing is to be executed in the CPU 30 is increased. Therefore, during the time when the RIP processing has not been executed, the control section 20 executes the UI processing with large load. Next, a reason for the condition (B) being imposed will be described below. In a case that the number of RIP-processed data 44b is five or more (in other words, when the print queue page counter 42 is 5 or more), a situation, in which the completion of the RIP processing is to be awaited at the time of executing the print processing, is considered to be difficult to arise. In other words, a situation, in which it is necessary to wait for the RIP-processed data 44b to be stored in the memory 40 irrespective of whether or not the abovementioned specific time Tf has elapsed, is considered to be difficult to arise. Therefore, the control section 20 executes the UI processing with large load.

Figure 4:
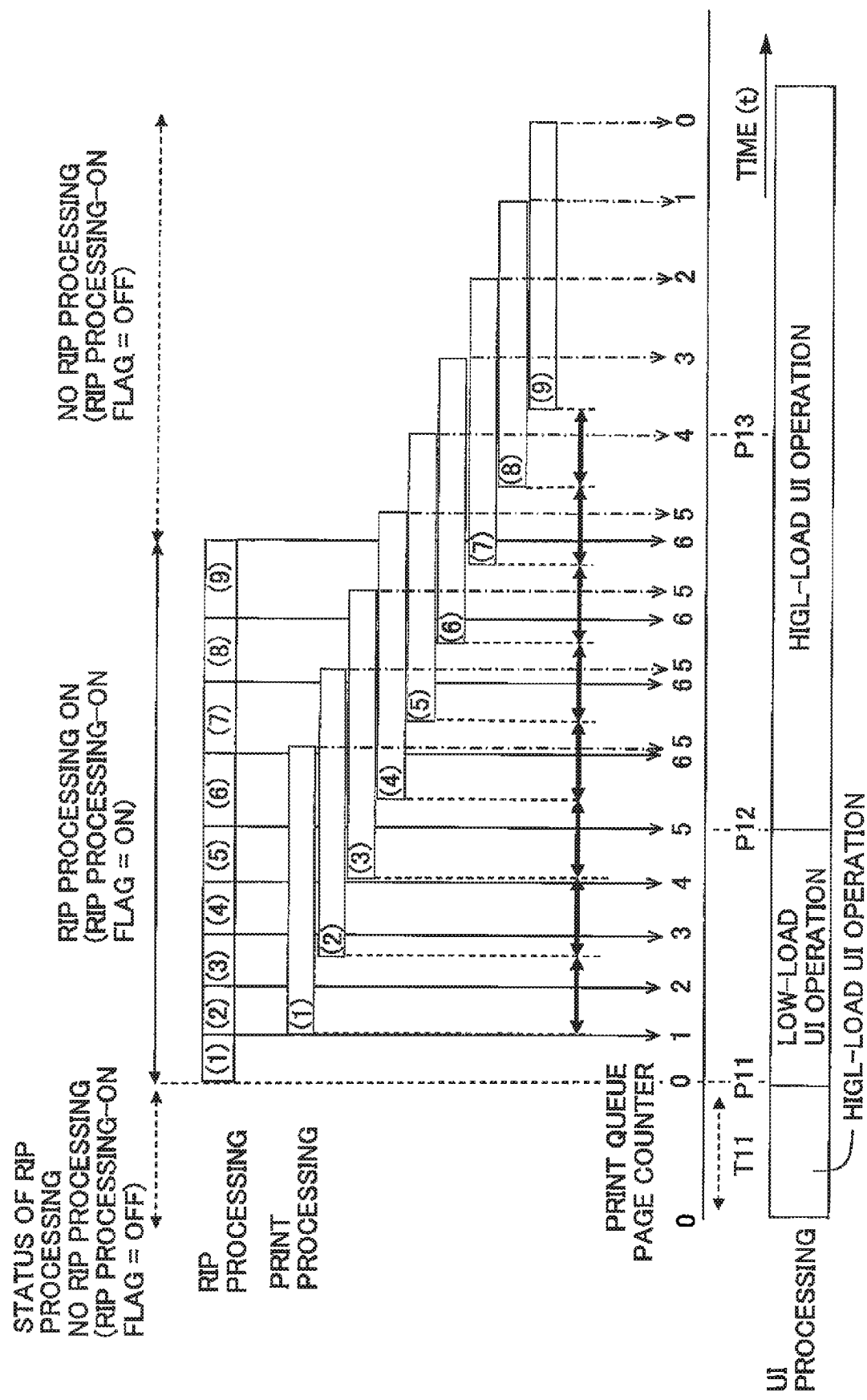
FIG. 4 is a diagram showing a time chart in which each processing is indicated along a time series upon considering conditions (A) and (B)

As shown in FIG. 4, at time T11, the RIP processing has not been executed (or in other words, condition (B) has been satisfied but condition (A) has not been satisfied), the control section 20 executes the UI processing with large load. As time P11 is elapsed, the control section 20 starts the RIP processing. At this time, along with condition (A), condition (B) is also satisfied. Consequently, the control section 20 executes the UI processing with small load from the time P11 till the time when the number of the RIP-processed data 44b becomes five or more. As time P12 is elapsed, since the number of RIP-processed data 44b becomes five or more (in other words, condition (A) is satisfied but condition (B) is not satisfied), the control section 20 executes the UI processing with large load. Thereafter, during the time from time P13 onward, since the number of RIP-processed data is less than five but the RIP processing has not been executed (in other words, condition (B) has been satisfied but condition (A) has not been satisfied), the control section 20 continues to execute the UI processing with large load.

In such manner, by the processing being executed according to conditions (A) and (B), the control section 20 is capable of increasing time for the RIP processing when the number of the RIP-processed data 44b stored in the memory 40 is small. As a result, the control section 20 is capable of improving a probability with which a plurality of print processing can be executed continuously every Tf. In other words, the control section 20 is capable of executing the plurality of print processing continuously and most efficiently (in a short time).

Next, a difference between a processing of displaying UI with a large load and a processing of displaying UI with a small load will be described below by referring to FIGS. 5A and FIG. 5B.

In general, larger the number of image data which undergoes transition during a specific time, higher is a proportion with which the ill processing is executed per unit time in the CPU 30. Therefore, in the first embodiment, in a case of displaying sequentially a plurality of image data as animation, the time required by the CPU 30 for the UI processing is changed by changing the number of image data which undergoes transition during the specific period. In the first embodiment, the UI processing with large load means a processing with a large number of image data which undergoes transition during the specific time. Image data for displaying on the display section 61 in the UI processing has been stored in the memory 40 in advance.

Figure 5A:
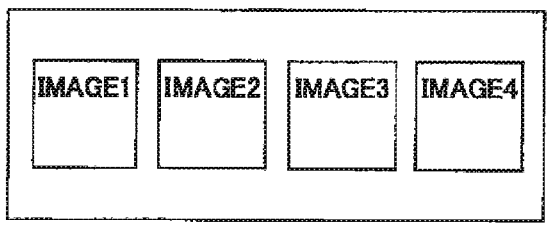
FIG. 5A is a diagram showing a UI operation at the time of executing each UI processing with high load.
Figure 5A:
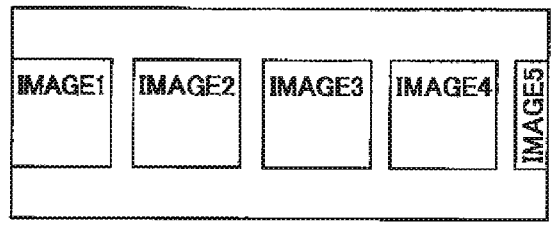
Figure 5A:
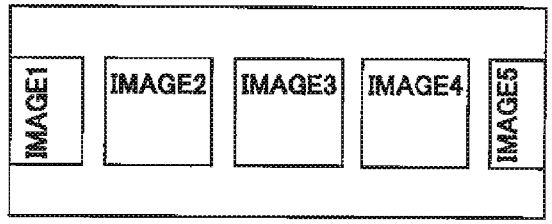
Figure 5A:
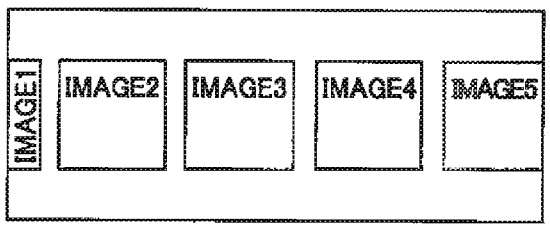
Figure 5A:
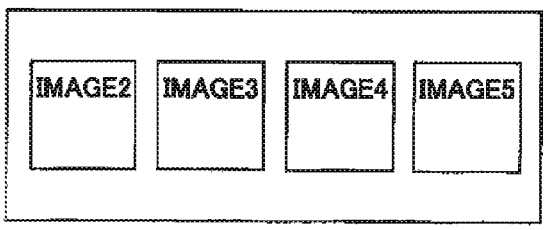

As shown in FIG. 5A, in the UI processing with large load, the control section 20 displays image data of five pages from (1) to (5) on the display section 61 in the specific time. In the first embodiment, the description will be made by assuming that the time from completion of the display of image data of (1) till completion of the display of image data of (5) is one second.

In FIG. 5A, the control section 20 executes the UI processing of changing the image data as follows. In other words, the control section 20 executes the UI processing with the following flow. Display status of image data of (1) is maintained (0.15 seconds) transition from image data of (1) to image data of (2) (0.1 seconds)→display status of image data of (2) is maintained (0.15 seconds) transition from image data of (2) to image data of (3) (0.1 seconds) display status of image data of (3) is maintained (0.15 seconds) transition from image data of (3) to image data of (4) (0.1 seconds)→display status of image data of (4) is maintained (0.15 seconds) transition from image data of (4) to image data of (5) (0.1 seconds).

Figure 5B:
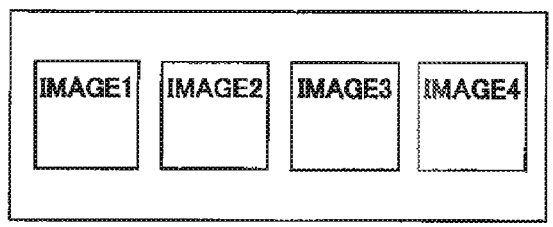
FIG. 5B is a diagram showing a UI operation at the time of executing each UI processing with low load.
Figure 5B:
Figure 5B:
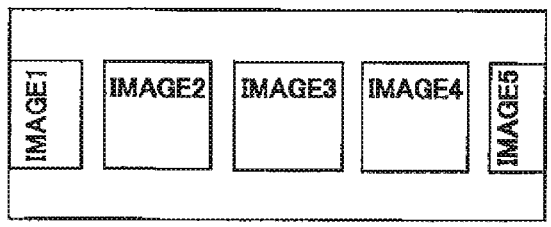
Figure 5B:
Figure 5B:
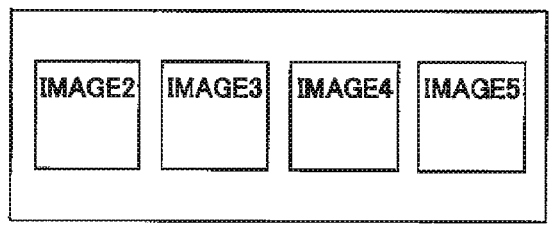

On the other hand, as shown in FIG. 5B, in the UI processing with low load, the display section 20 displays image data of three (1), (3), and (5) in a specific time. In other words, in FIG. 5B, image data of three pages (1), (3), and (5) from among the image data of (1) to (5) used in (A) is used. Even in FIG. 5B, similarly as in FIG. 5A, the description will be made by assuming that the time from completion of the display of image data of (1) till completion of the display of image data of (5) is one second.

In FIG. 5B, the control section 20 executes the UI processing of changing the image data as follows. In other words, the control section executes the UI processing with the following flow. Display status of image data of (1) is maintained (0.4 seconds) transition from image data of (1) to image data of (3) (0.1 seconds) display status of image data of (3) is maintained (0.4 seconds) transition from image data of (3) to image data of (5) (0.1 seconds).

In this manner, the time required for the transition of the image (in other words, time excluding the time when the display status is maintained) is 0.4 seconds in FIG. 5A whereas, the time required for the transition of image is 0.2 seconds in FIG. 5B. As a result, in FIG. 5B, it is possible to reduce the time for executing the UI processing by the CPU 30, as compared to the time in FIG. 5A.

Next, the image processing executed in the first embodiment will be described below by referring to FIG. 6. As it has been mentioned above, processing which is executed in the image processing is classified into three types. Concretely, the processing is classified into the UI processing, the RIP processing, and the print processing as shown in FIG. 6.

Figure 6:
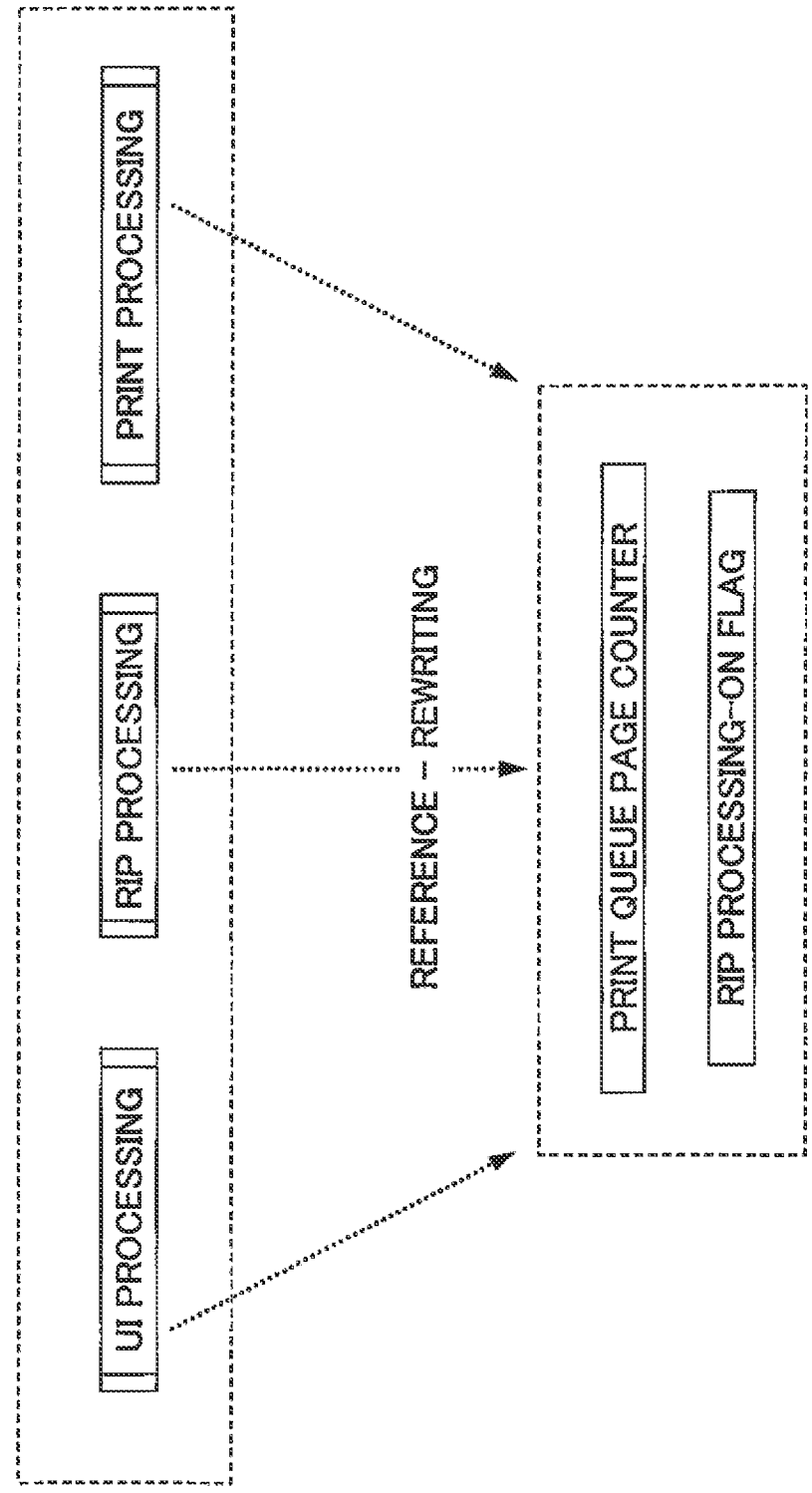
FIG. 6 is a diagram in which an outline of an overall image processing is explained.

As shown in FIG. 6, in each processing, the control section 20 refers appropriately to the print queue page counter 42 and the RIP processing-on flag 43. According to a result of each processing, the control section 20 rewrites the content of the print queue page counter 42 and the RIP processing-on flag 43.

Each of the three processing is started by a power supply of the printer 10 being put ON by an operation of the operating section 62 by the user. As the power supply is put ON, the control section 20 initializes the abovementioned print queue page counter 42 and the RIP processing-on flag 43. Concretely, the control section 20 lets the print queue page counter to be 0, and also puts the RIP processing-on flag 43 OFF.

As it has been described above, as the print queue page counter 42 and the RIP processing-on flag 43 are initialized, the control section 20 executes the UI processing, the RIP processing, and the print processing in parallel. The three processing will be described below in detail.

Firstly, the UI processing will be described below by referring to a flowchart in FIG. 7.

The control section 20 refers to the RIP processing-on flag 43, and checks whether or not the RIP processing-on flag is OFF (step S102). When the RIP processing-on flag 43 is confirmed to be OFF (YES at step S102), the control section 20 executes the UI processing for high (large) load (step S108).

Whereas, when the RIP processing-on flag 43 is confirmed to be ON (NO at step S102), the control section 20 refers to the print queue page counter 42, and checks whether or not the print queue page counter 42 is 5 or more (step S104). When the print queue page counter 42 is confirmed to be 5 or more (YES at step S104), the control section 20 makes a judgment that the sufficient number of the RIP-processed data 44b has been stored in the memory 40, and executes the UI processing with high load (step S108). Whereas, when the print queue page counter 42 is confirmed to be less than 5 (NO at step S104), the control section 20 makes a judgment that the sufficient number of the RIP-processed data 44b has not been stored in the memory 40, and executes the UI processing with low load (step S108). By doing so, when a judgment is made that the RIP-processed data 44b in the memory 40 is insufficient, the control section 20 is capable of reducing the time which is assigned for the UI processing by the CPU 30, and increasing the time which is assigned for the RIP processing instead.

Figure 8:
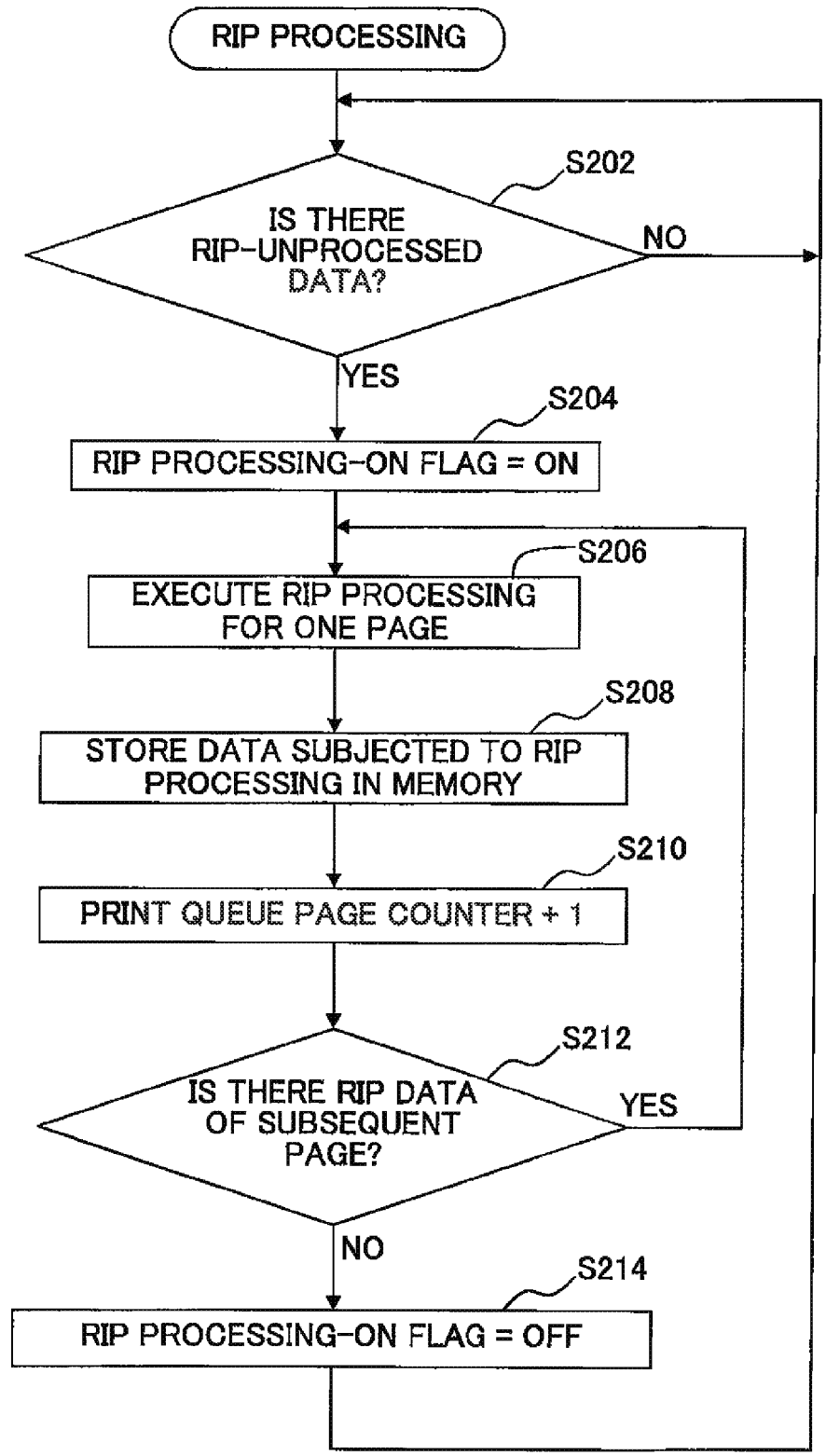
FIG. 8 is a flowchart showing an RIP processing which is executed according to the first embodiment.

Next, the RIP processing will be described below by referring to a flowchart in FIG. 8.

The control section 20 checks whether or not the RIP-unprocessed data 44a has been stored in the memory 40 (step S202). The processing at step S202 is executed repeatedly till the RIP-unprocessed data 44a is confirmed to have been stored in the memory 40.

When the RIP-unprocessed data 44a has been confirmed to have been stored in the memory 40 (YES at step S202), the control section 20 puts the abovementioned RIP processing-on flag 43 ON (step S204).

Next, the control section executes the RIP processing on the RIP-unprocessed data 44a equivalent to one paper page (step S206). Thereafter, the control section 20 stores the RIP-processed data 44b which has been subjected to RIP processing, in the memory 40 (step S208), and increments a value of the print queue page counter 42 (step S210).

Next, the control section 20 identifies whether or not the RIP processing for all the pages has been completed for the RIP-unprocessed data 44a on which the RIP processing has been executed at step S206 (step S212). Concretely, the control section 20, when the RIP-unprocessed data 44a has been judged to include a plurality of pages, identifies whether or not the execution of the RIP processing for the last page has been completed.

When a page for which the RIP processing has not been executed is identified (YES at step S212), the control section 20 shifts the processing to step S206, and executes the RIP processing for the page on which the RIP processing has not been executed. Whereas, when it is identified that the RIP processing has been executed for all the pages (NO at step S212), the control section 20 puts the abovementioned RIP processing-on flag 43 OFF (step S214), and shifts the processing to step S202.

Next, the print processing will be described below by referring to a flowchart in FIG. 9. The print executing section 63 of the first embodiment includes a printing mechanism of laser type and the print process for one page is executed in order of paper feeding, development, fixing, and paper discharging.

Firstly, the control section 20 identifies whether or not it is a timing at which the paper feeding for printing is possible (step S302). For instance, regarding the RIP-processed data 44b of the first page in FIG. 2 ((1) in the diagram), it is identified whether or not it is a timing of (at) point A. When it has been identified that it is not the timing at which the paper feeding for printing is possible (NO at step S302), the control section 20 shifts the processing to step S308.

As the timing at which the paper feeding for printing is possible, the following two cases are to be assumed. In other words, two cases namely, (1) a case in which the RIP-processed data does not exist, and the print processing has not been executed, and (2) a case in which the print processing has been executed on the RIP-processed data, the abovementioned specified time Tf has elapsed after the paper feeding is started, and it is possible to start printing of the subsequent RIP-processed data 44b, are to be assumed.

When it has been identified that it is a timing at which the paper feeding for printing is possible (YES at step S302), the control section 20 identifies whether or not the RIP-processed data 44b has been stored in the memory 40 (step S304). In a case in which, the RIP-processed data 44b has been stored (YES at step S304), the control section, starts feeding the paper for printing the RIP-processed data 44b on the paper (step S308). Whereas, in a case in which the RIP-processed data 44b has not been stored in the memory 40 (NO at step S304), the control section 20 shifts the processing to step S308.

Next, the control section 20 identifies whether or not the execution of the print processing on any of the RIP-processed data 44b has been completed, and the document has been discharged (step S308). For instance, regarding the RIP-processed data 44b of the first page in FIG. 2 ((1) in the diagram), a judgment of whether or not it is a timing at which a point B has elapsed is made. When it has been identified that it is a timing at which, the point B has elapsed (YES at step S308), the control section 20 decrements the print queue page counter 42 (step S310).

Figure 9:
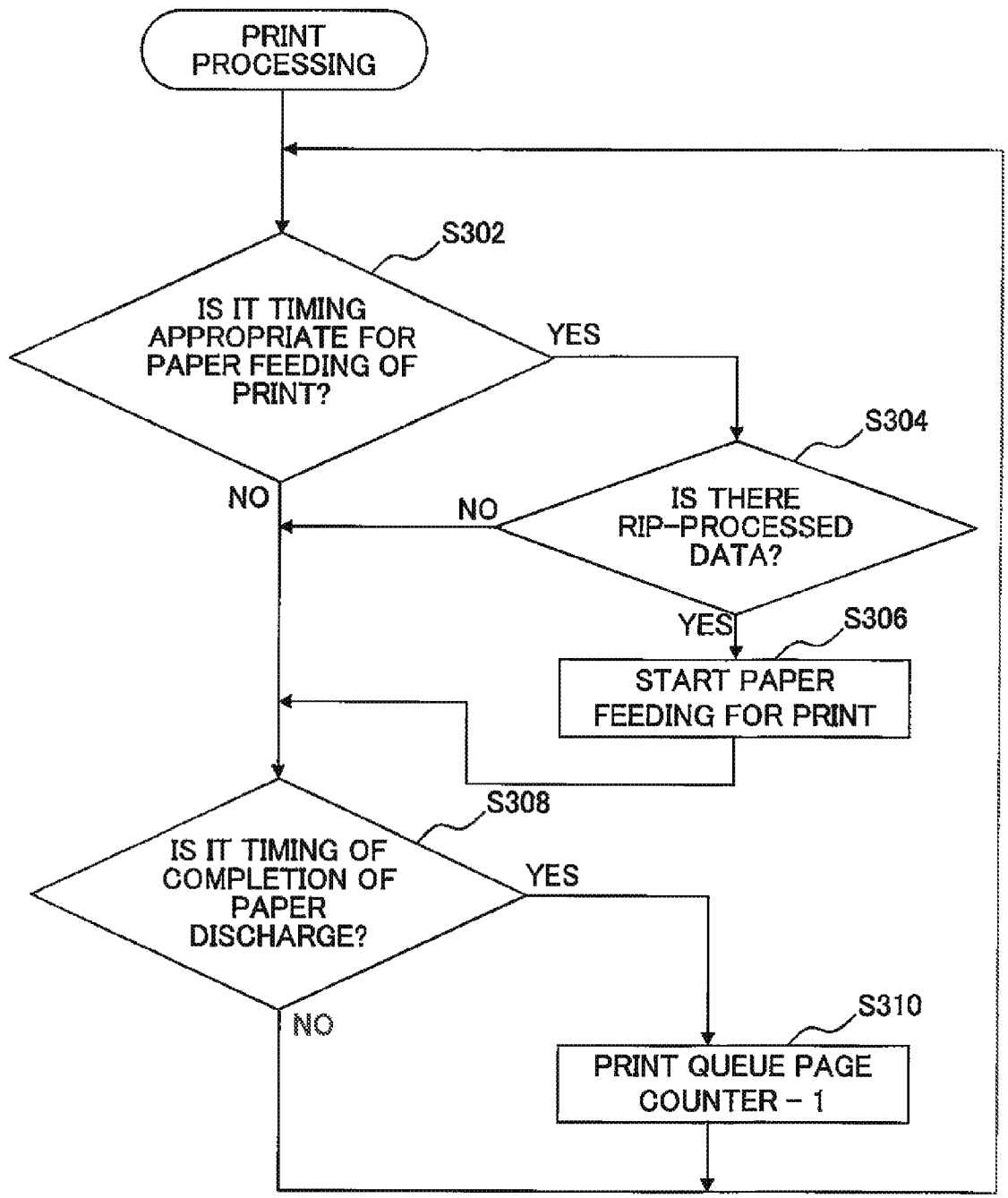
FIG. 9 is a flowchart showing a print processing which is carried out according to the first embodiment.
Figure 10A:
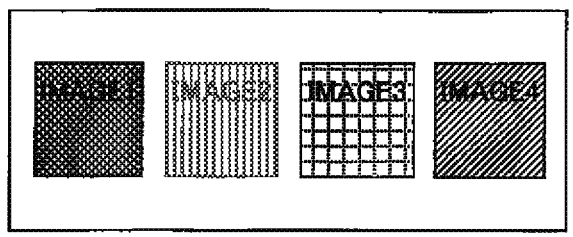
FIG. 10A is a diagram showing a UI operation at the time of executing each UI processing with high load according to a second embodiment.
Figure 10A:
Figure 10A:
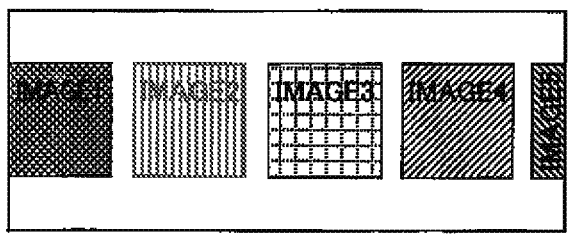
Figure 10A:
Figure 10A:
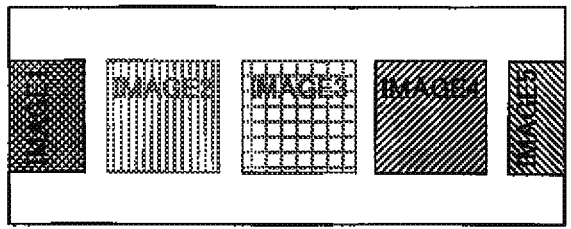
Figure 10B:
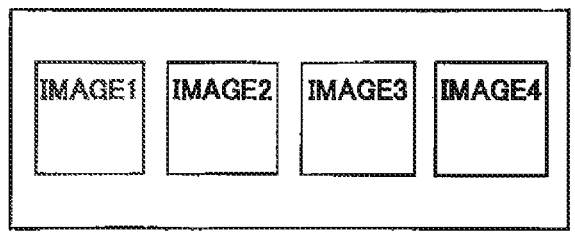
FIG. 10B is a diagram showing a UI operation at the time of executing each III processing with low load according to the second embodiment.
Figure 10B:
Figure 10B:
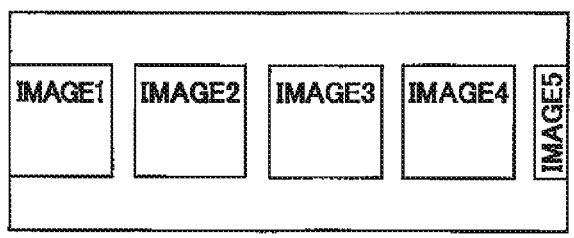
Figure 10B:
Figure 10B:
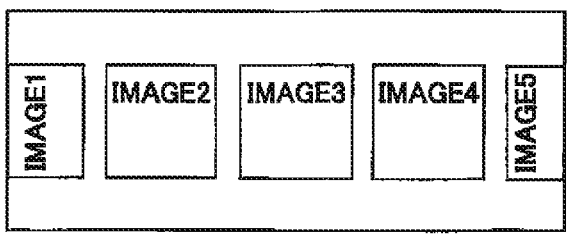
Figure 11A:
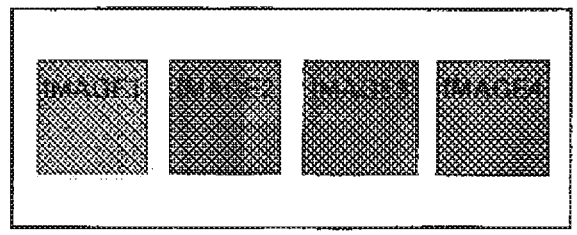
FIG. 11A is a diagram showing a UI operation at the time of executing each UI processing with high load according to a third embodiment.
Figure 11A:
Figure 11A:
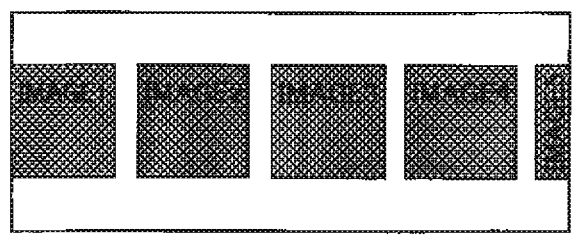
Figure 11A:
Figure 11A:
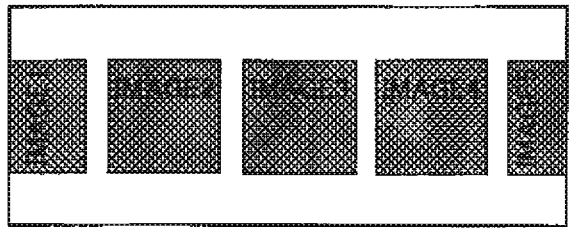
Figure 11B:
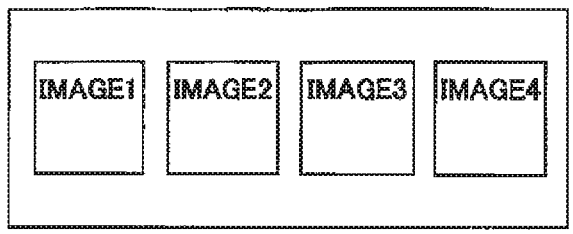
FIG. 11B is a diagram showing a UI operation at the time of executing each UI processing with low load according to the third embodiment.
Figure 11B:
Figure 11B:
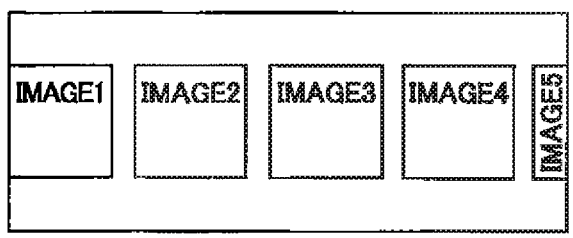
Figure 11B:
Figure 11B:
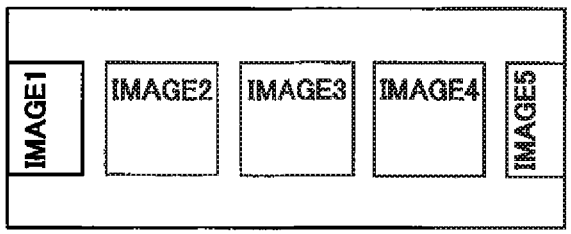

In this manner, in the print processing shown in FIG. 9, the control section 20 monitors continuously, the timing at which the paper feeding is possible, and the timing at which the paper discharge is completed. When the timing is none of the two timings, the control section 20 continues to execute the processing at step S302 and step S308 alternately. Whereas, when it is a timing at which, the paper feeding is possible (such as point A in FIG. 2), the control section 20 executes the processing at step S304 and step S306. Whereas, when it is a timing at which, the paper discharge is completed (such as point B in FIG. 2), the control section 20 executes the processing at step S310.

Next, a second embodiment of the present invention will be described below by referring to FIG. 10. The structure of the printer 10 and the three processing mentioned above (UI processing, RIP processing, and print processing) being similar as in the first embodiment, the description thereof is omitted.

In general, even when the content of image data to be displayed is the same, in a case of displaying color image data, time for transition of image data becomes longer as compared to a case of displaying black-and-white image data. In other words, in the case of displaying color image data, the time of the UI processing to be executed by the CPU becomes longer as compared to the time in the case of displaying black-and-white image data.

In light of this, in the second embodiment, in the UI processing with high load, the color image data is allowed to undergo transition as shown in the diagram. Whereas, in the UI processing with low load, the black-and-white image data is allowed to undergo transition. In such manner, the control section 20, in the UI processing, by switching between as to whether color image data with a large image data size is to be used, or black-and-white image data with a small image data size is to be used, is capable of executing the RIP processing appropriately.

In the UI indicated in the second embodiment, a case of a transition of a plurality of image data is shown. However, it may be a still-image UI in which a single image data is displayed continuously.

Next, a third embodiment of the present invention will be described below by referring to FIG. 11. The structure of the printer 10 and the three processing (UI processing, RIP processing, and print processing) described above being similar as in the first embodiment, the description thereof is omitted.

In general, even when the content of the image data to be displayed is same, in a case of displaying image data with a high resolution, since data size of the image data becomes large, the time required for transition of the image data becomes longer as compared to a case of displaying image data with low resolution. In other words, in the ease of displaying the image data with high resolution, the time of the UI processing which is executed by the CPU 30 becomes longer as compared to the case of displaying the image data with low resolution.

As shown in the diagram, in the third embodiment, in the UI processing with high load, image data with first resolution is allowed to undergo transition, whereas, in the UI processing with low load, image data with second resolution is allowed to undergo transition. For instance, let the first resolution be 600 (dpi)×600 (dpi), and let the second resolution be 300 (dpi)×300 (dpi). In such manner, in the UI processing, by switching over to whether the image data with high resolution is to be used or the image data with low resolution is to be used, it is possible to execute the RIP processing appropriately.

In the UI indicated in the third embodiment, the case in which, the plurality of image data undergoes transition is shown. However, instead of such case, the UI may be a UI of a still image in which a single image data is displayed continuously.

Figure 7:
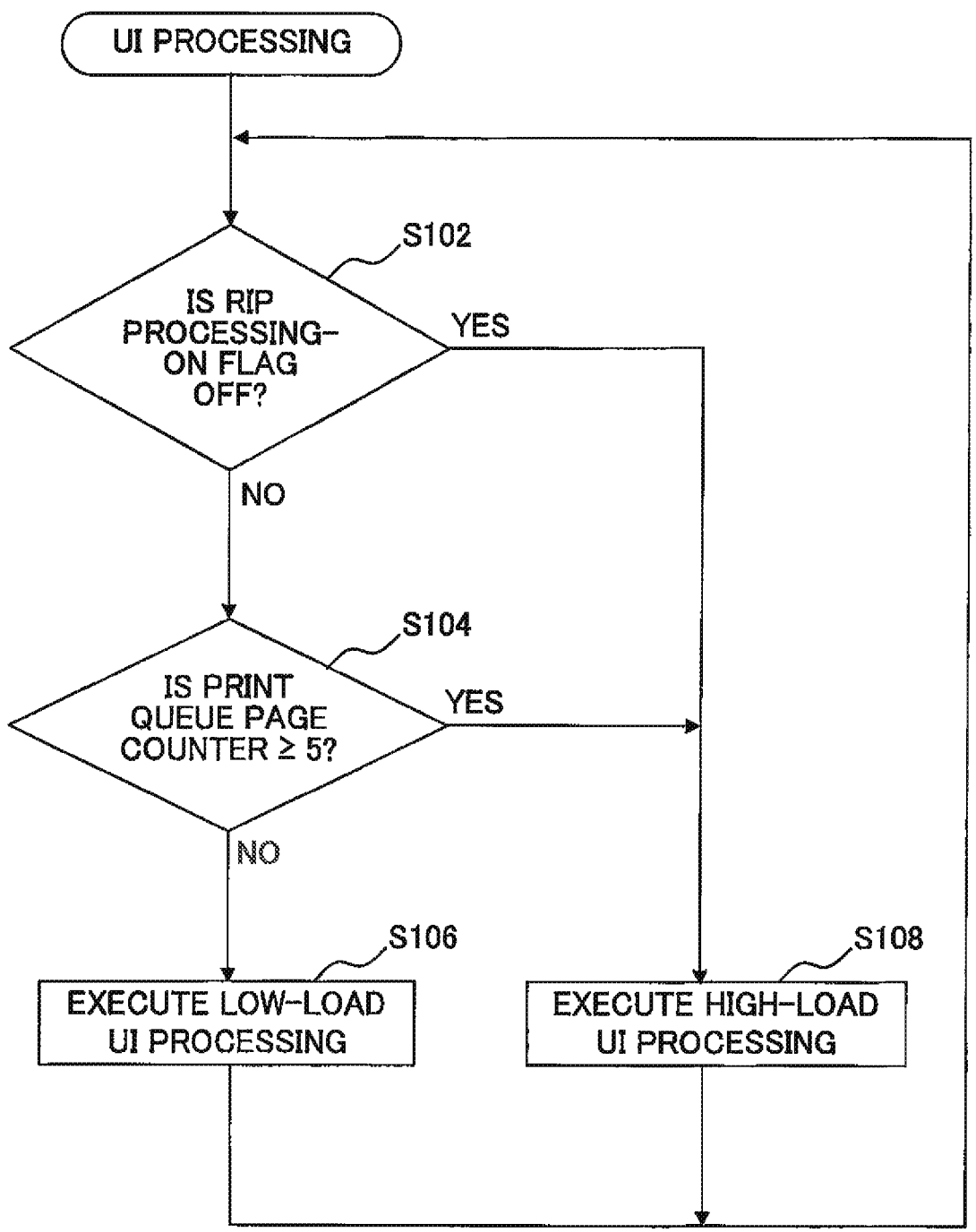
FIG. 7 is a flowchart showing a UI processing which is carried out according to the first embodiment.

In the description made above, from an image processing program which is executed by the control section 20, steps from S102 to S108 in FIG. 7 correspond to the processing which is executed by the first processing executing section of the present teaching. Moreover, steps from S202 to S214 in FIG. 8 correspond to the processing which is executed by the second processing executing section. Furthermore, steps from S302 to S310 in FIG. 9 correspond to the processing which is executed by the third processing executing section. Moreover, step S208 in FIG. 8 corresponds to the processing which is executed by the storage section. Step S104 in FIG. 7 corresponds to the processing which is executed by the identifying section. Step S102 in FIG. 7 corresponds to the processing which is executed by the judging section.

Moreover, the UI processing corresponds to the first processing of the present teaching, the RIP processing corresponds to the second processing of the present teaching, and the print processing corresponds to the third processing of the present teaching.

The RIP-unprocessed data corresponds to the first data of the present teaching, and the RIP-processed data corresponds to the second data of the present teaching.

As it has been described above, the printer 10 executes the UI processing of supplying image data to the display section 61 which displays the image data, and the RIP processing on the RIP-unprocessed data 44a. The control section 20 identifies the number of the RIP-processed data 44h stored in the memory 40. When a judgment is made that the number of the RIP-processed data 44b which has been identified is smaller than a predetermined threshold value (such as 5), the control section 20 executes the TIE processing with low load. Whereas, when a judgment is made that the number of the RIP-processed data 44b which has been identified is same as or more than the predetermined threshold value, the control section 20 executes the UI processing with high load. In such manner, by switching the proportion with which the UI processing is executed per unit time in the CPU 30, the printer 10 is capable of executing the RIP processing appropriately.

A technical scope of the present invention is not restricted to the embodiments described above, and it is possible to execute by various embodiments described below.

In the embodiments described above, a case of executing the RIP processing as the second processing has been described. However, it may also be a different arrangement. For instance, in a case in which the control section is a scanner unit, the second processing may be an image processing which is executed on image data on which scanning is executed by a scanning executing section, and may be image processing (such as enlarging processing and magnification processing) together with the scanning execution.

In this case, it may be a so-called push scan in which, the user gives an instruction for executing scanning by operating the operating section 27 of the printer, or it may be a so-called pull scan in which, the user gives an instruction for executing scanning by operating an operating section of the terminal unit and the printer.

Moreover, the control apparatus may be a printer or a terminal unit. Moreover, the second data may be stored in the printer or in the terminal unit.

In the embodiments described above, the UI processing of animation form in which the plurality of images undergoes sequential transition has been described. However, the present invention may also be applied to a different arrangement. For instance, the invention of the present application may be applied to a transition of image data by a so-called flick action in which, the user pushes the display section by a finger, and allows the display section to undergo transition by scrolling the display section by a finger.

Moreover, in the UI processing of each embodiment described above, an arrangement in which, the image data is displayed on the display section 61 has been described. However, the arrangement may be such that image data is formed by a character string.

Moreover, in the first embodiment described above, the time required by the CPU 30 for the UI processing is changed by changing the number of the image data which undergoes transition in a specified time. Here, in the first embodiment described above, the control section 20 changes the number of image data which undergoes transition in the specific time by changing the time for which the display status of each image data is maintained. However, the arrangement may be different. For instance, the control section may change the number of image data which undergoes transition in the specific time by changing the time of transition from the first image data to the second image data which is displayed subsequently to the first image data.

In the second embodiment, it has been described that the UI processing with high load is a processing of allowing transition of color image data of the first number of pages in the specific time, and the UI processing with low load is a processing of allowing transition of black-and-white image data of the first number of pages in the specific time. However, the arrangement may be different from that in the second embodiment. In other words, the UI processing with high load may be a processing of allowing transition of color image data of the first page in the specific time, and the UI processing with low load may be a processing of allowing transition of black-and-white image data of the second number of pages which is smaller than the first number of pages in the specific time.

Moreover, the UI processing with high load may be a processing of allowing transition of black-and-white image data of first number of pages in the specific time, and the UI processing with low load may be a processing of allowing transition of color image data of second number of pages in the specific time. For instance, even when it is color image data, when the number of image data to be allowed to undergo transition is small, even a smaller proportion with which the UI processing is executed per unit time in the CPU, than for the black-and-white image data serves the purpose.

Apart from the each embodiment described above, the control section 20, as the UI processing with high load, may cause transition of image data for which the size of the image data is large, and as the UI processing with low load, may cause transition if image data for which the size of the image data is small. The size of image data is a size which is determined by the number of pixels which express the image data.

In the embodiments described above, the function of each of the units 51 to 56 is realized by executing processing according to the image processing program, by the CPU 30. However, at least one of the units 51 to 56 may be realized by hardware such as a logic circuit.

What is claimed is:

1. A control apparatus which is configured to communicate with an external apparatus, to control a display section and a printing section, and to execute a plurality of processing in parallel, the control apparatus comprising:
   a storage section which is configured to store image data to be supplied to the display section and first data transmitted from the external apparatus,
   a first processing executing section which is configured to execute a first processing in which the image data is supplied to the display section;
   a second processing executing section which is configured to execute a second processing, which is to be executed in parallel with the first processing, and in which a predetermined image processing is applied to the first data to generate second data to be stored in the storage section; and
   an identifying section which is configured to identify the number of the second data stored in the storage section,
   wherein in a first case, in which the number of the second data identified by the identifying section is smaller than a predetermined threshold value, the first processing executing section is configured to execute the first processing such that a proportion of time for the first processing to unit time is a first proportion, and
   in a second case, in which the number of the second data identified by the identifying section is the predetermined threshold value or larger, the first processing executing section is configured to execute the first processing such that the proportion of the time for the first processing to the unit time is a second proportion which is greater than the first proportion.

2. The control apparatus according to claim 1, further comprising:
   a judging section which is configured to make a judgment as to whether or not the first data is stored in the storage section,
   wherein the second processing is executed under a condition that the judging section judges that the first data is stored in the storage section, and
   in a third case, in which the judging section judges that the first data is not stored in the storage section, the first processing executing section is configured to execute the first processing with the second proportion per unit time irrespective of the number of second data which has been stored in the storage section.

3. The control apparatus according to claim 1,
   wherein the image data is stored as a plurality of image data, and the first processing executing section is configured to supply the plurality of image data to the display section sequentially.

4. The control apparatus according to claim 3, wherein the first processing executing section is configured to execute the first processing with the first proportion by elongating a period from completion of display of a first image data among the plurality of image data until completion of display of a second image data which is supplied to the display section next to the first image data.

5. The control apparatus according to claim 1, wherein the first processing executing section is configured to execute the first processing with the first proportion by reducing a data size of the image data to be displayed on the display section.

6. The control apparatus according to claim 1,
wherein in the first case, the image data is displayed on the display section by a single color, and
in the second case, the image data is displayed on the display section by a plurality of colors.

7. The control apparatus according to claim 1,
wherein in the first case, the image data is displayed on the display section with a first resolution, and
in the second case, the image data is displayed on the display section with a second resolution which is higher than the first resolution.

8. The control apparatus according to claim 1, further comprising a third processing executing section which is configured to control the printing section to execute a third processing in which the second data is printed on a recording medium,
wherein the third processing executing section is configured to wait to execute the third processing in a case that the second data is not stored in the storage section, the third processing executing section is configured to execute the third processing in a ease that the second data is stored in the storage section, and
the number of second data which is stored in the storage section is decreased by the third processing being executed.

9. The control apparatus according to claim 1, wherein the second processing is a Raster Image Processer processing.

10. A non-transitory computer readable storage medium in which a control program is stored, the control program being usable for a printer which is configured to communicate with an external apparatus and to include a printing section, a display section, and a storage section which is configured to store image data to be supplied to the display section and first data transmitted from the external apparatus, and the control program making the printer execute a plurality of processing comprising:
a first processing in which the image data is supplied to the display section;
a second processing which is to be executed in parallel with the first processing, and in which a predetermined image processing is applied to the first data to generate second data to be stored in the storage section; and
an identifying processing in which the number of the second data stored in the storage section,
wherein in a first case, in which the number of the second data identified by the identifying processing is smaller than a predetermined threshold value, the control program makes the printer execute the first processing such that a proportion of time for the first processing to unit time is a first proportion, and
in a second case, in which the number of the second data identified by the identifying processing is the predetermined threshold value or larger, the control program makes the printer execute the first processing such that the proportion of the time for the first processing to the unit time is a second proportion which is greater than the first proportion.

11. A printer which is configured to communicate with an external apparatus, comprising:
a printing section;
a display section; and
a control section which is configured to control the printing section and the display section, to include one central processing unit and a storage section which is configured to store image data to be supplied to the display section and first data transmitted from the external apparatus,
wherein the central processing unit is configured to function as:
a first processing executing section which is configured to execute a first processing in which the image data is supplied to the display section;
a second processing executing section which is configured to execute a second processing, which is to be executed in parallel with the first processing, and in which a Raster Image Processer processing is applied to the first data to generate second data to be stored in the storage section;
a third processing executing section which is configured to control the printing section to execute a third processing, which is to be executed in parallel with the second processing, and in which the second data stored in the storage section is printed on a recording medium; and
an identifying section which is configured to identify the number of the second data stored in the storage section,
wherein in a first case, in which the number of the second data identified by the identifying section is smaller than a predetermined threshold value, the first processing executing section is configured to execute the first processing such that a proportion of time for the first processing to unit time is a first proportion, and
in a second case, in which the number of the second data identified by the identifying section is the predetermined threshold value or larger, the first processing executing section is configured to execute the first processing such that the proportion of the time for the first processing to the unit time is a second proportion which is greater than the first proportion, and
wherein the third processing executing section is configured to wait to execute the third processing in a case that the second data is not stored in the storage section, the third processing executing section is configured to execute the third processing in a case that the second data is stored in the storage section, and
the number of second data which is stored in the storage section is decreased by the third processing being executed.

12. The printer according to claim 11,
wherein the central processing unit is configured to further function as a judging section which is configured to make a judgment as to whether or not the first data is stored in the storage section,
wherein the second processing is executed under a condition that the judging section judges that the first data is stored in the storage section, and
in a third case, in which the judging section judges that the first data is not stored in the storage section, the first processing executing section is configured to execute the first processing with the second proportion per unit time irrespective of the number of second data which has been stored in the storage section.

13. The printer according to claim 11,
wherein the image data is stored as a plurality of image data, and
the first processing executing section is configured to supply the plurality of image data to the display section sequentially.

14. The printer according to claim 13, wherein the first processing executing section is configured to execute the first processing with the first proportion by elongating a period from completion of display of a first image data among the plurality of image data until completion of display of a second image data which is supplied to the display section next to the first image data.

15. The printer according to claim 11, wherein the first processing executing section is configured to execute the first processing with the first proportion by reducing a data size of the image data to be displayed on the display section.

16. The printer according to claim 11,
wherein in the first case, the image data is displayed on the display section by a single color, and
in the second case, the image data is displayed on the display section by a plurality of colors.

17. The printer according to claim 11,
wherein in the first case, the image data is displayed on the display section with a first resolution, and
in the second case, the image data is displayed on the display section with a second resolution which is higher than the first resolution.

18. The printer according to claim 11,
wherein the third processing is executed for each of the second data stored in the storage section continuously, and
the predetermined threshold value is the number of the second data stored in the storage section by which the third processing are executed most effectively.

* * * * *